Patented June 24, 1930

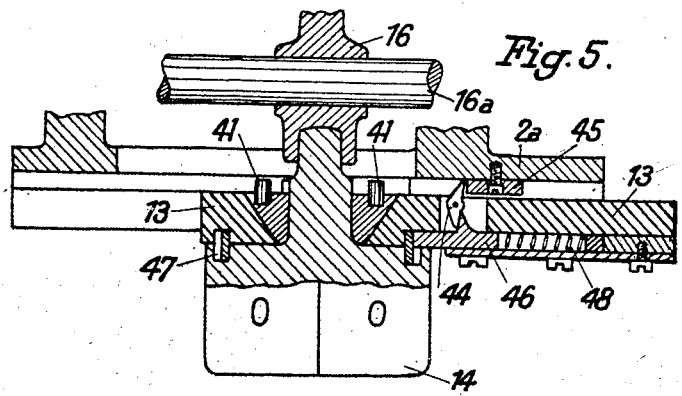
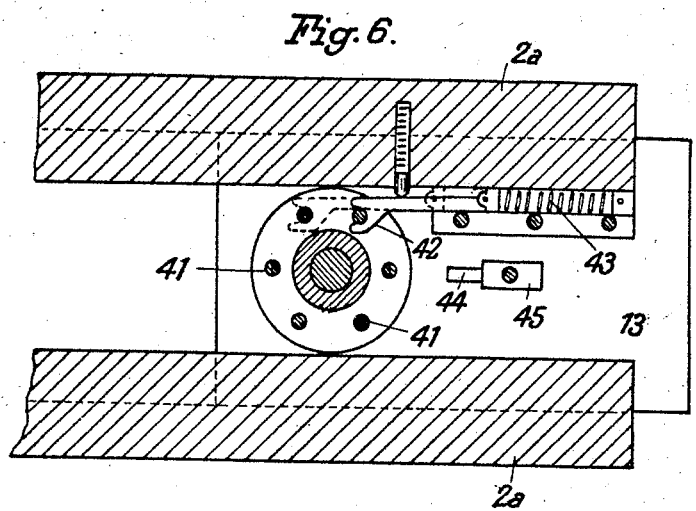
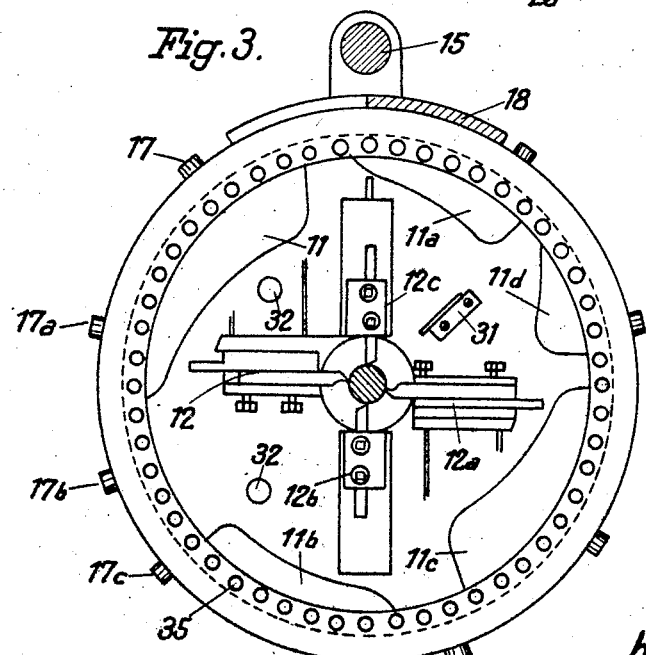

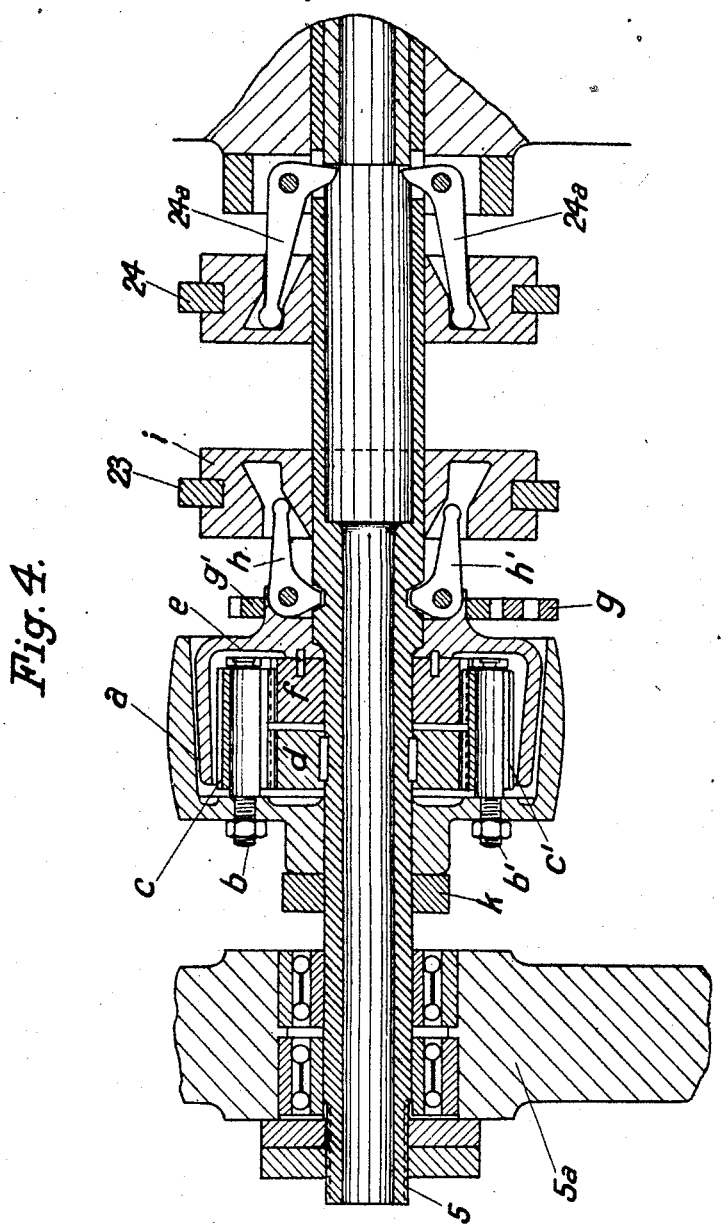

1,767,224

UNITED STATES PATENT OFFICE

FRIEDRICH MULKA, OF SUHL IN THURINGEN, GERMANY

AUTOMATIC LATHE

Application filed November 4, 1926, Serial No. 146,216, and in Germany November 16, 1925.

This invention relates to automatic lathes. According to this invention the lathe has a fixed face plate as a carrier for the work and a moving control ring for the tools. The advantage of the improved lathe is that the tools operate upon the work in the immediate vicinity of the bearing of the work spindle, and that the onesided pressure of the tools on the work and flexion of the latter can be prevented by allowing different tools to act simultaneously from different directions. The use of a single control ring has the great advantage that in the transmission of the movement from the control ring to the tools levers are entirely avoided. In consequence hereof the construction and building of the lathe are rendered simple. Its reliability of action and its length of life are also increased by its simple structure. The lathe takes up but little room and requires little power to drive it.

The subject matter of the invention is shown by way of example in the drawings.

Figure 3 is an end elevation.

Figure 4 is a longitudinal section through the spindle headstock.

Figures 5 and 6 are details of the turret head.

Figure 1:
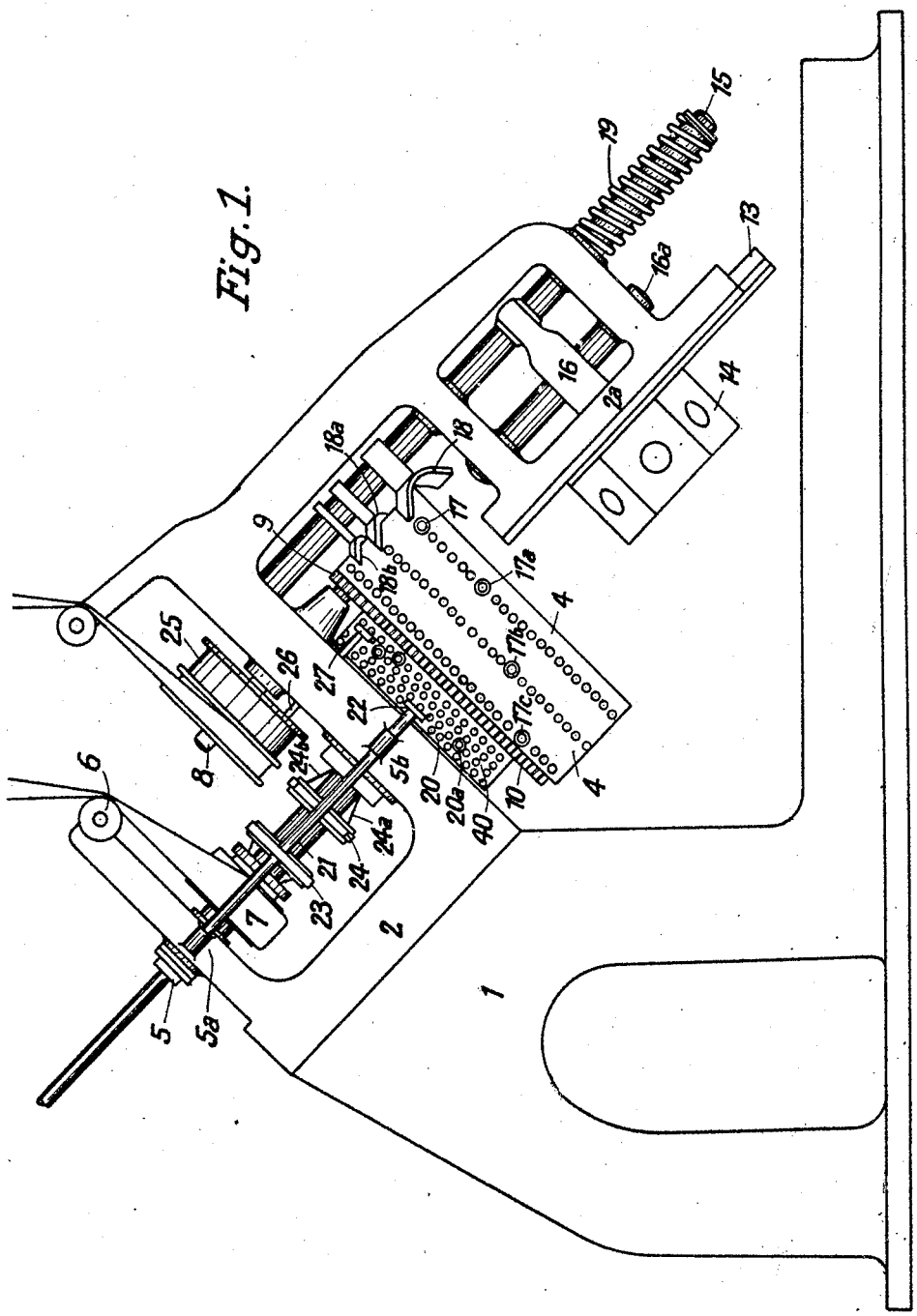
Figure 1 is a front elevation of the lathe.

Upon the inclined platform of an underframe 1 is mounted the frame 2 of the lathe. On the frame 2 is mounted a fixed face plate 3. On the face plate 3 is rotatably mounted by means of roller bearings 33 a control ring 4. A hollow work spindle 5 is mounted in the frame 2 at $5^a$ and $5^b$. The fixed face plate 3 acts as a bearing for the head of the work spindle 5.

The work spindle is driven by means of belts 7 which run over guide rollers 6 and drive a belt pulley $a$ which is mounted on the work spindle 5. This belt pulley is made the casing of a sun and planet gearing. By the aid of this sun and planet gearing the changes of speed of the work spindle are effected.

The control ring 4 is driven by a gear wheel 9 which is mounted on a shaft 8 and gears into a gear 10 on the feed ring 4. The shaft 8 is driven by a second belt through a sun and planet gearing 25.

The inner surface of the control ring 4 is provided with parallel circumferential grooves $4^a$, $4^b$, $4^c$ and $4^d$. In these grooves are inserted cam members 11, $11^a$, $11^b$, $11^c$ (Fig. 3). The position of these cam members may be varied as desired. The members are secured in the positions in which they are set by stay bolts 34, which are contained in holes 35 in the control ring 4. The cam members are provided for the purpose of moving the supports 12, $12^a$ $12^b$, $12^c$ mounted on the fixed face plate 3. The supports 12 and $12^a$ receive forming tools for example and the supports $12^b$ and $12^c$ cutting off or parting tools for example. As is clearly shown in Figure 3 the supports surround the piece of work which is fed forward by the spindle 5 and to which the tools are brought up in a radial direction. In consequence of this arrangement of the tools the forces which they exert on the piece of work are mutually compensated, so that the piece of work is not subjected to any onesided pressure and cannot therefore bend. This method of action permits of working at an extremely high cutting speed and with an extraordinarily rapid feed.

The frame 2 of the lathe has a guide $2^a$ in which a longitudinal slide 13 is adapted to move and which carries a turret head 14. The movement of the longitudinal slide is produced by a thrust rod 15. To this latter is attached a connecting member 16, which slides on a guide $16^a$ and extends to the slide 13. The thrust rod 15 also carries three cam members 18, $18^a$ and $18^b$. In the control ring 4 are mounted rollers 17, $17^a$, $17^b$, $17^c$, the position of which varies according to desire. For this purpose the control ring has in its periphery a number of holes which are arranged in rows (see Figure 1). The above mentioned rollers act upon the cam members 18, $18^a$ and $18^b$ respectively mounted on the thrust rod 15.

The retrograde movement of the slide 13 is produced by the spring 19.

The sun and planet gear which drives the work spindle 5 is controlled by the rollers 20 and 20ª which are adjustably mounted on the control ring extension 10 and act on a sliding member 22 (see Figure 1). The sliding member 22 is carried by a thrust rod 21, which carries a clutch arm 23, which embraces a ring $i$ (Figure 4) adapted to be moved by the clutch arm and so control the sun and planet gear. In the same way the chuck for the material to be operated on is controlled by a clutch arm 24, a sliding rod, a sliding member and an antifriction roller, which lie at the back of the lathe. The sun and planet gearing 25 carried on the shaft 8 and which drives the control ring, is controlled in the same way by a clutch lever, a sliding rod 26 and a sliding member 27. The sun and planet gearing contained in the interior of the belt pulley $a$ is constructed in the following manner:—

In the side wall of the belt pulley $a$ are fixed two carrier pins $b$ and $b^1$ to carry the planet wheels $c$ and $c^1$. These planet wheels gear into the gear wheel $d$ mounted on the work spindle and into the gear wheel $f$ mounted on the cone member $e$. This cone member $e$ and the gear wheel $f$ rotate conjointly with the work spindle 5. The gear wheel $f$ has ten teeth and the gear wheel $d$ eleven teeth. When gearing is in action, a pawl $g$, which engages in the ratchet wheel $g^1$, holds the cone member $e$ immovable. This cone member under these circumstances is not in contact with the conical inner surface of the belt pulley. The cone member $e$ can be moved by means of belt crank levers $h$ and $h'$ one end of which engages in a groove in the work spindle and the other end in a cone-shaped controlling groove in the ring $i$.

When the parts are in this position the ratio of transmission is 1:10. At a high speed the pawl $g$ will be lifted out of engagement with the teeth of the ratchet wheel $g'$, while the bell crank levers $h$ and $h'$ couple the cone member $e$ to the hollow cone $a$. The coupling is adjustable by means of an adjusting ring $k$.

The advantage of this sun and planet gearing is that the gearing is placed in the body of the belt pulley, whereby a compact construction is secured, and that the adjustable coupling of the cone and its adjustment by a ring with a conical groove is considerably more certain and simple than the adjustment obtained by known arrangements.

The rotation of the turret head 14 is produced in the following manner:—

When the slide 13 moves from left to right (see Figs. 1, 5 and 6), one of the bolts 41 enters a clutch lever 42 and moves it to the right against the pressure of the spring 43. Shortly before the right hand terminal position of the clutch lever 42 is reached a lever 44 strikes against a stop 45, which is fixed on the guide bed 2ª. This lever 44, when it strikes against the said stop 45, withdraws a locking bolt 46 from locking teeth 47 on the turret head. A spring 48 tends to press the locking bolt 46 into the locking teeth 47. Immediately the locking bolt 46 has been withdrawn from the locking teeth 47 the pressure of the spring 43 moves the clutch lever 42 to the left, whereby rotation of the head 14 through an angle of 60 degrees is produced. On the rotation of the head 14 the next feed pin 41 strikes hard against the clutch lever 42. The clutch lever is made elastic. It therefore damps the blow and prevents the head from rotating more than 60 degrees.

When the slide 13 moves from right to left the lever 44 moves away again from the stop 45 and allows the locking bolt 46 to engage in the next locking tooth 47.

The cam member 18ª effects all the idle feed motions of the turret head when less than six tools are used. The cam member is used for longitudinal turning, longitudinal boring and drilling, longitudinal reaming, etc. The cam member 18ᵇ is used when cutting screw threads. The pitch of the cam must correspond to the pitch of the thread.

Figure 2:
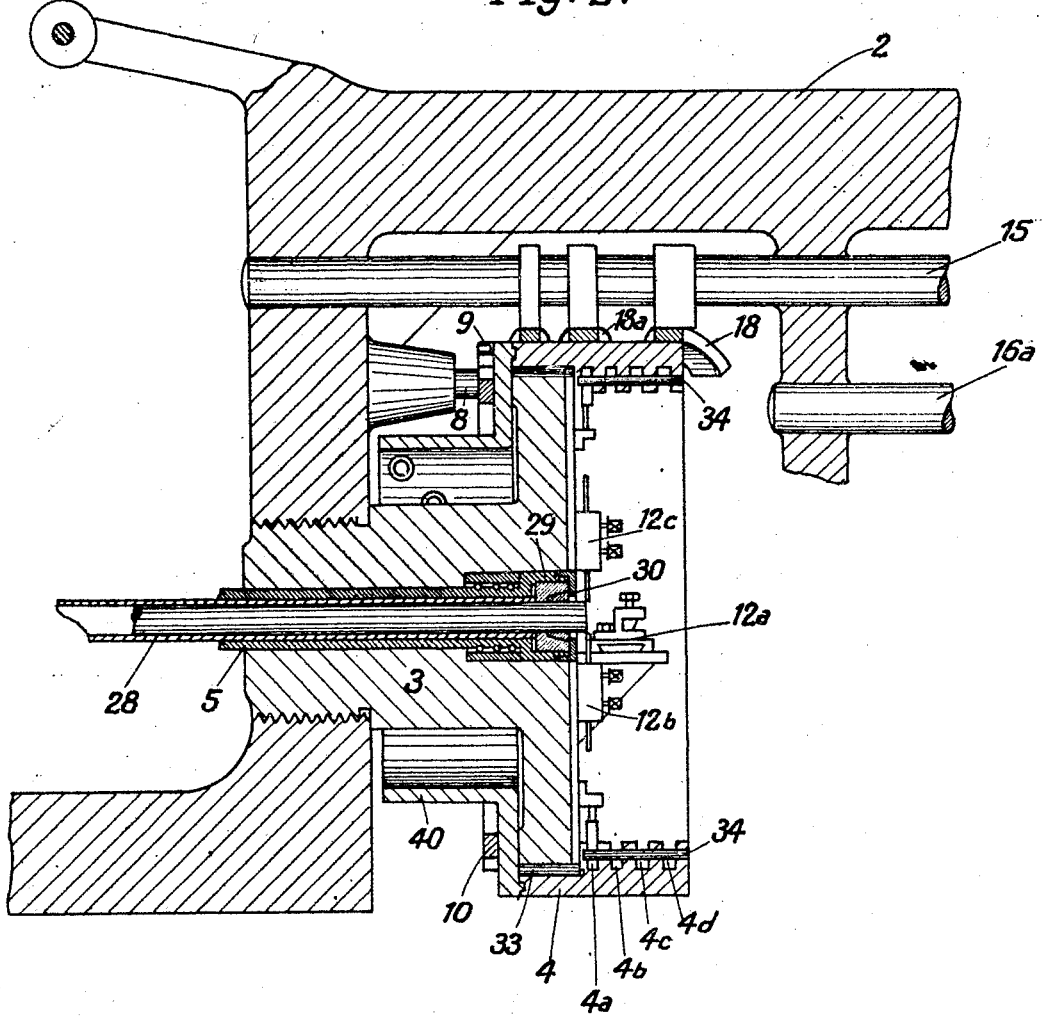
Figure 2 is a vertical longitudinal section through the fixed face plate and the control ring.

The chucking and feeding of the piece of work are effected as follows: The clutch lever 24 adjusts the bell crank lever 24ª. By means of the chuck sleeve 28 these latter push the cone chuck 29 over the chuck jaws 30 (see Figure 2) which thus securely hold the work. The piece of work advances under the action of its own weight automatically when the chuck jaws are opened. When this takes place the piece of work strikes against a stop buffer fixed in the turret head 14. The turret head is advanced by the cam member 18ª a distance equal to the length of the chuck jaws and at the same time pushes the work back by the same length. This is done for the purpose of ensuring a sufficient length for the chuck to grip when the bar of material is used up.

Sufficient space is left in the fixed face plate to accommodate a copying member at 31 and, at 32, an arm for holding the centering sleeve, stay guide, etc.

I claim:—

1. In an automatic lathe having a fixed face plate carrying radially movable tool supports and a rotatable gear-driven control ring for said tool supports, said control ring being provided with a series of interchangeable and adjustable cam members, said cam members acting directly on the outer end of said tool supports for moving the latter toward the work.

2. In an automatic lathe having a fixed face plate carrying radially movable tool supports and a rotatable gear-driven control ring for said tool supports, said control ring having inner circumferential grooves interchangeable and adjustable cam members arranged in said grooves, said cam members acting directly on the outer end of said tool supports for moving the latter toward the work.

3. In an automatic lathe having a fixed face plate carrying radially movable tool supports and a rotatable gear-driven control ring for said tool supports, said control ring being provided with a series of interchangeable and adjustable cam members, said cam members acting directly on the outer end of said tool supports for moving the latter toward the work, interchangeable rollers being mounted on the outer surface of said control ring, said rollers being adapted to shift rods parallel to the axis of the lathe, said rods controlling the gear of the work spindle and the turret head.

4. In an automatic lathe, a fixed face plate through which the work extends, tools mounted on the face plate and surrounding the work, said tools being movable radially of the work, a rotatable ring mounted on the face plate and having parallel circumferential grooves the walls of which are pierced with a number of openings, cams positioned within said grooves for engaging and moving said tools, each cam having an opening in line with corresponding openings in the walls of the grooves, and stay means engaged in said openings to secure the cams in position.

5. In an automatic lathe, a fixed face plate through which the work extends, tool members mounted on the face plate and movable radially of the work, a control ring rotatably mounted on the face plate and having means for moving the said tool members, driving means for rotating the said ring, and control means operable from the ring for controlling the said driving means.

6. In an automatic lathe, a fixed face plate carrying radially movable tool supports, a rotatable ring mounted on the face plate and having cams for engaging and moving the said tool supports, drive gearing for rotating said ring, a clutch for said gearing including a thrust rod, and means on said ring for shifting said thrust rod.

7. In an automatic lathe, a fixed face plate through which the work extends, chuck jaws carried by the plate for securing the work, said plate and jaws being inclined to the horizontal to enable the work to advance by action of its own weight automatically when the check jaws are opened, a slidable turret having means for limiting the advancement of the work at such time, a control ring rotatably mounted on the face plate, means operated from the control ring for opening the check jaws, and means also operated from the control ring for moving the turrethead subsequent to the feed of the work in a reverse direction a distance equal to the length of the check jaws.

8. In an automatic lathe, a fixed face plate through which the work extends, a hollow work-carrying spindle having its head journaled in said face plate, and tools mounted on said face plate and feeding radially of the work, said face plate and said spindle being disposed on an oblique line for supporting the work at an inclination to the horizontal.

9. In an automatic lathe, a fixed face plate, means for feeding the work through the face plate, radially movable tool supports carried by the face plate, a rotatable control ring, means for rotating the said ring continuously during operation of the lathe, and curved elements carried by said ring and engaging directly the said tool supports for moving the latter toward the work.

10. In an automatic lathe, a fixed face plate through which the work extends, radially movable tools carried by said plate, a rotatable control ring having fixed cam members for engaging the tools to force the same in the direction of the work, and means for rotating the said ring continuously during operation of the lathe to cause a movement toward the work.

11. In an automatic lathe, the combination with a plurality of slidable thrust rods carrying cam members, of a separate mechanism actuated by each rod, a rotatable gear-drive control ring having a number of holes arranged in rows, and rollers, variously located in said holes for engaging the cam members of the said thrust rods.

In testimony whereof I have affixed my signature.

FRIEDRICH MULKA.